(12) United States Patent
Avery et al.

(10) Patent No.: US 9,248,960 B2
(45) Date of Patent: Feb. 2, 2016

(54) DUAL-TANK LIQUID STORAGE SYSTEM

(71) Applicant: BIG HOLDING SYSTEMS LTD., Calgary (CA)

(72) Inventors: Brian Edwin Avery, Calgary (CA); George William Briggs, Olds (CA); Richard James Schaefer, The Woodlands, TX (US); Kevin Chan Vilaiya, Houston, TX (US)

(73) Assignee: BIG HOLDING SYSTEMS LTD., Calgary (CA)

( * ) Notice: Subject to any disclaimer, the term of this patent is extended or adjusted under 35 U.S.C. 154(b) by 44 days.

(21) Appl. No.: 14/380,759

(22) PCT Filed: Oct. 9, 2013

(86) PCT No.: PCT/CA2013/000872
§ 371 (c)(1),
(2) Date: Aug. 25, 2014

(87) PCT Pub. No.: WO2014/056091
PCT Pub. Date: Apr. 17, 2014

(65) Prior Publication Data
US 2015/0021319 A1    Jan. 22, 2015

Related U.S. Application Data

(60) Provisional application No. 61/711,644, filed on Oct. 9, 2012.

(51) Int. Cl.
*B65D 90/02* (2006.01)
*B65D 90/24* (2006.01)
(Continued)

(52) U.S. Cl.
CPC .............. *B65D 90/024* (2013.01); *B23P 19/04* (2013.01); *B65D 90/046* (2013.01); *B65D 90/08* (2013.01); *B65D 90/24* (2013.01); *Y10T 29/49826* (2015.01)

(58) Field of Classification Search
CPC .... B65D 90/024; B65D 90/08; B65D 90/046; B65D 90/24; B65D 90/04; B23P 19/04; Y10T 29/49826

USPC ........... 220/4.12, 4.16, 4.04, 4.08, 4.06, 4.07, 220/567, 586, 23.9, 23.86, 677, 62.21, 220/62.11
See application file for complete search history.

(56) References Cited

U.S. PATENT DOCUMENTS 4,305,518 A * 12/1981 Boyd ..................... B65D 90/08
                                                        220/4.13
4,871,081 A   10/1989 Ershig
(Continued)

FOREIGN PATENT DOCUMENTS

AU       2011202269 A1    12/2011
CA         2680662 A1     9/2008
(Continued)

OTHER PUBLICATIONS

International Search Report re PCT/CA2013/000872, issued by the ISA/CA on Dec. 30, 2013.
(Continued)

*Primary Examiner* — Robert J Hicks
*Assistant Examiner* — Kareen Thomas
(74) *Attorney, Agent, or Firm* — Donald V. Tomkins

(57) ABSTRACT

A dual-tank liquid storage tank system comprises a lined primary storage tank disposed within a lined secondary tank. Construction of the system involves rolling out a secondary tank liner over an engineered base course, and then laying out a primary tank liner over the secondary tank liner, with an outer portion of the primary tank liner rolled up to fit within the primary tank perimeter. The primary tank's perimeter wall is then assembled from wall panels resting on the secondary tank liner, and then the primary tank liner rolled out and deployed over the primary tank wall. An outer portion of the secondary tank liner is then rolled up toward the primary tank wall, and the secondary tank's perimeter wall is assembled from wall panels resting on the base course. The secondary tank liner is then rolled out and deployed over the secondary tank wall.

22 Claims, 10 Drawing Sheets

(51) Int. Cl.
- *B65D 90/04* (2006.01)
- *B65D 90/08* (2006.01)
- *B23P 19/04* (2006.01)

(56) References Cited

U.S. PATENT DOCUMENTS

| | | | |
|---|---|---|---|
| 5,084,119 A | 1/1992 | Barksdale | |
| 5,454,195 A | 10/1995 | Hallsten | |
| 5,601,204 A | 2/1997 | Hall | |
| 7,014,391 B2 | 3/2006 | Starheim et al. | |
| 7,494,298 B2 | 2/2009 | Perkins | |
| 7,574,834 B2 | 8/2009 | Murray | |
| 7,966,786 B2 * | 6/2011 | Koteskey | E02D 29/12 220/4.04 |
| 8,074,406 B2 | 12/2011 | Ksenych et al. | |
| 8,534,480 B1 * | 9/2013 | Hanna | B65D 90/08 220/4.16 |
| 2008/0222977 A1 | 9/2008 | Hinner | |
| 2011/0194893 A1 | 8/2011 | Wiebe | |
| 2011/0243664 A1 | 10/2011 | Sullivan | |
| 2011/0272303 A1 * | 11/2011 | Peterken | B65D 88/08 206/223 |

FOREIGN PATENT DOCUMENTS

| | | |
|---|---|---|
| WO | 2011/035819 A1 | 3/2011 |
| WO | WO 2014/056091 A1 | 4/2014 |

OTHER PUBLICATIONS

Written Opinion of the International Searching Authority re PCT/CA2013/000872, issued by the ISA/CA on Dec. 30, 2013.

* cited by examiner

DUAL-TANK LIQUID STORAGE SYSTEM

FIELD OF THE DISCLOSURE

The present disclosure relates in general to storage tanks for liquids, and in particular to open-top modular storage tanks used in the petroleum industry and other industries that require large-scale and inexpensive liquid storage such as for fire-fighting water (field and municipal), potable water storage (remote and municipal), water for fish farming (fresh and sea), mining, etc. More particularly, the disclosure relates to systems and methods for constructing a circular storage tank with secondary containment means to contain liquid escaping the storage tank in the event of leakage.

BACKGROUND

It is increasingly common in the oil and gas industry to use hydraulic fracturing (colloquially known as "fraccing" or "fracking") to aid in the recovery of hydrocarbon fluids such as crude oil and natural gas from subsurface formations. Hydraulic fracturing is a process involving the injection of a "fraccing fluid" (or "frac fluid") under pressure into spaces such as cracks and fissures within a subsurface petroleum-bearing formation, such that the fluid pressure forces the cracks and fissures to become larger, and/or induces new fractures in the formation materials, resulting in more and/or larger flow paths through which hydrocarbon fluids can flow out of the formation and into a well drilled into the formation. Fraccing fluids typically carry particulate materials called "proppants" that are intended to stay inside the enlarged or newly-created subterranean fissures after the fraccing fluid has been drained out of the formation and hydraulic pressure has been relieved.

There are various different types and formulations of fraccing fluids, but regardless of the type of fraccing fluid being used, one thing common to all fraccing operations is the need for temporary storage of very large volumes of fraccing fluid at the well site, both to provide a reservoir of frac fluid for injection into subsurface formations, and to store frac fluid circulated out of the well after completion of fraccing operations. Storage tanks having volumes of 250,000 to 2,500,000 U.S. gallons or more are commonly required for this purpose.

For practical and environmental reasons, such tanks are typically of modular design so that their components can be shipped by truck to remote well sites, where they can be erected on site and eventually disassembled and shipped off site after they are no longer needed. Open-top liquid storage tanks most commonly are circular, as this is the most stable and efficient structural configuration for a liquid storage tank. Modular circular tanks typically comprise multiple horizontally-curved steel wall panels having a radius corresponding to the radius of the finished tank. The vertical side edges of each curved wall panel abut and are fastened to the vertical side edges of adjacent wall panels by suitable structural connection means, such that when all of the wall panels have been erected and interconnected, they form a circular tank having a particular height, diameter, and liquid storage capacity. A suitable liquid-tight liner is then installed inside the tank, covering a prepared ground surface inside the tank perimeter and extending up and typically over the tank wall. The tank is then ready to receive a fraccing fluid or other liquid that needs to be stored.

Environmental regulations require storage tanks for many different types of liquids to be provided with secondary containment means to protect against environmental contamination in the event of a tank leak. For example, petroleum storage tanks are commonly constructed within a containment reservoir formed by earthen berms lined with synthetic liners or engineered clay liners installed or constructed below the ground surface. Such secondary containment means may be practical for "tank farm" installations where the primary liquid storage tanks are essentially permanent. However, they are not a practical or acceptable option on well sites requiring tanks for temporary storage of large volumes of liquid (such as fraccing fluid) and where such temporary tanks must be demountable so as to cause little or no permanent environmental disturbance in the area where the temporary tanks were constructed.

One known way of providing secondary containment is to build a primary storage tank within a secondary tank structure, such that if the primary tank should develop a leak, the secondary tank will provide a second line of defence against liquid leakage into the surrounding environment. The present disclosure teaches an innovative process for constructing a primary open-top storage tank within a secondary containment tank without significant disturbance to the environment.

BRIEF SUMMARY

In general terms, the present disclosure teaches a dual-tank liquid storage system and methods for constructing such a liquid storage system, which comprises a lined primary storage tank disposed within a larger lined secondary tank. Construction of this dual-tank system typically involves the following steps:

An engineering base course is prepared over the ground area where the system is to be built, with the base course preferably being covered with a geotextile protective layer.

A flexible, impermeable liner for the secondary tank is then rolled out over the base course.

A flexible, impermeable liner for the primary tank is laid out over the secondary tank liner, with an outer portion being rolled up such that the partially rolled-up primary tank liner fits within the intended perimeter of the primary tank.

The perimeter wall of the primary tank is then site-assembled from a plurality of arcuate wall panel sections resting on the secondary tank liner, which is preferably protected by a liner protection material positioned over the secondary tank liner at the primary tank wall panel locations.

The rolled-up outer portion of the primary tank liner is unrolled and deployed up and over the fully-assembled wall of the primary tank.

An outer portion of the secondary tank liner is then rolled up so as to be temporarily disposed adjacent to the perimeter wall of the completed secondary tank.

The perimeter wall of the secondary tank is then site-assembled from a plurality of arcuate wall panel sections resting on the base course.

The rolled-up outer portion of the secondary tank liner is then unrolled and deployed up and over the fully-assembled wall of the secondary tank.

In the preferred embodiments illustrated and described herein, the primary and secondary tanks are generally circular in shape. In such embodiments, the primary and secondary tank wall panels are of arcuate configuration (in variant embodiments generally circular tanks could be constructed using wall panels that are substantially flat rather than arcuate). However, the methods taught herein can also be applied to the construction of dual-tank liquid storage tank system wherein either or both of the primary and secondary tanks may be of a non-circular configuration.

BRIEF DESCRIPTION OF THE DRAWINGS

Embodiments in accordance with the present disclosure will now be described with reference to the accompanying Figures, in which numerical references denote like parts, and in which:

FIG. 1A is a cross-sectional edge detail of the prepared ground area in FIG. 1, illustrating a structural base course engineered to support liquid storage tanks.

DESCRIPTION

Figure 1:
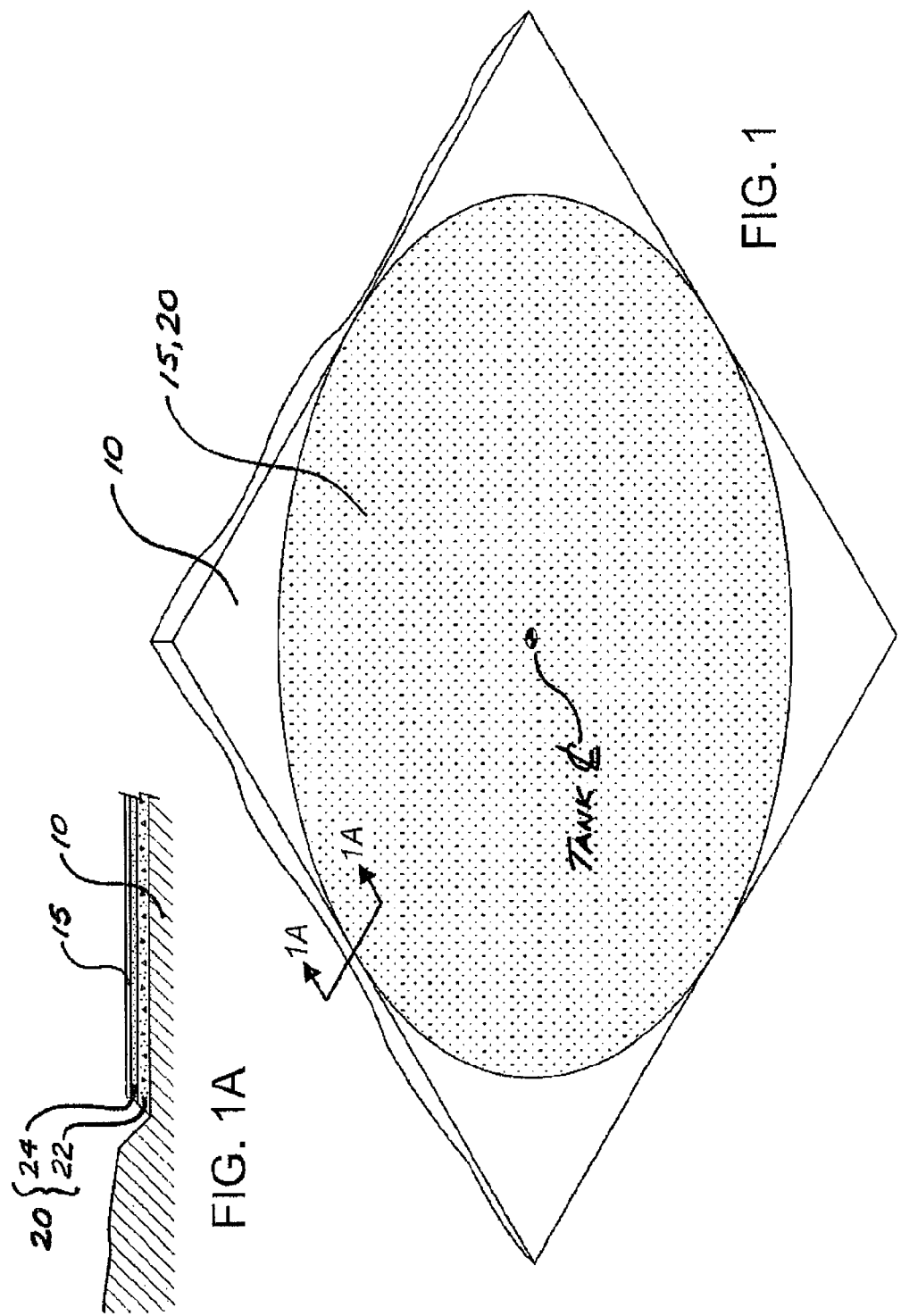
FIG. 1 is a perspective view of a ground area that has been prepared for construction of a dual-tank liquid storage system in accordance with one embodiment of a method taught by the present disclosure.

FIG. 1 illustrates a prepared ground surface 10 on top of which an engineered base course 20 has been constructed to provide stable ground support for a liquid storage tank assembly comprising a circular primary tank located generally concentrically inside a circular secondary tank in accordance with the present disclosure. Base course 20 will typically be a multi-layered soil structure, and as shown by way of non-limiting example in FIG. 1A may comprise a layer of compacted granular material 22 placed over ground surface 10, then finished with a sand layer 24 which can be levelled and compacted to provide a smooth and dense surface.

In one embodiment, granular layer 22 may comprise at least a two inches of ½-inch (12.7 mm) crush compacted to at least 100% of Standard Proctor maximum dry density. However, the appropriate design and construction of base course 20 for a given installation will preferably be determined having regard to the geotechnical properties of the subsoil where the tanks are to be built. Base course 20 will preferably extend radially outward beyond perimeter of the secondary tank by a distance selected to geotechnical requirements and to provide adequate working space during tank construction. For example, for an embodiment of the dual-tank system including a 1.25 million USG (≈4.7 million liters) primary tank having a diameter of 135 feet (≈41 meters) and disposed within a secondary tank having a diameter of 148 feet (≈45 meters), base course 20 preferably will cover a circular area having a diameter of approximately 200 feet (≈61 meters).

Base course 20 is preferably covered with a base course protection layer 15, which in one embodiment may be a double layer of a suitable geotextile.

Figure 2:
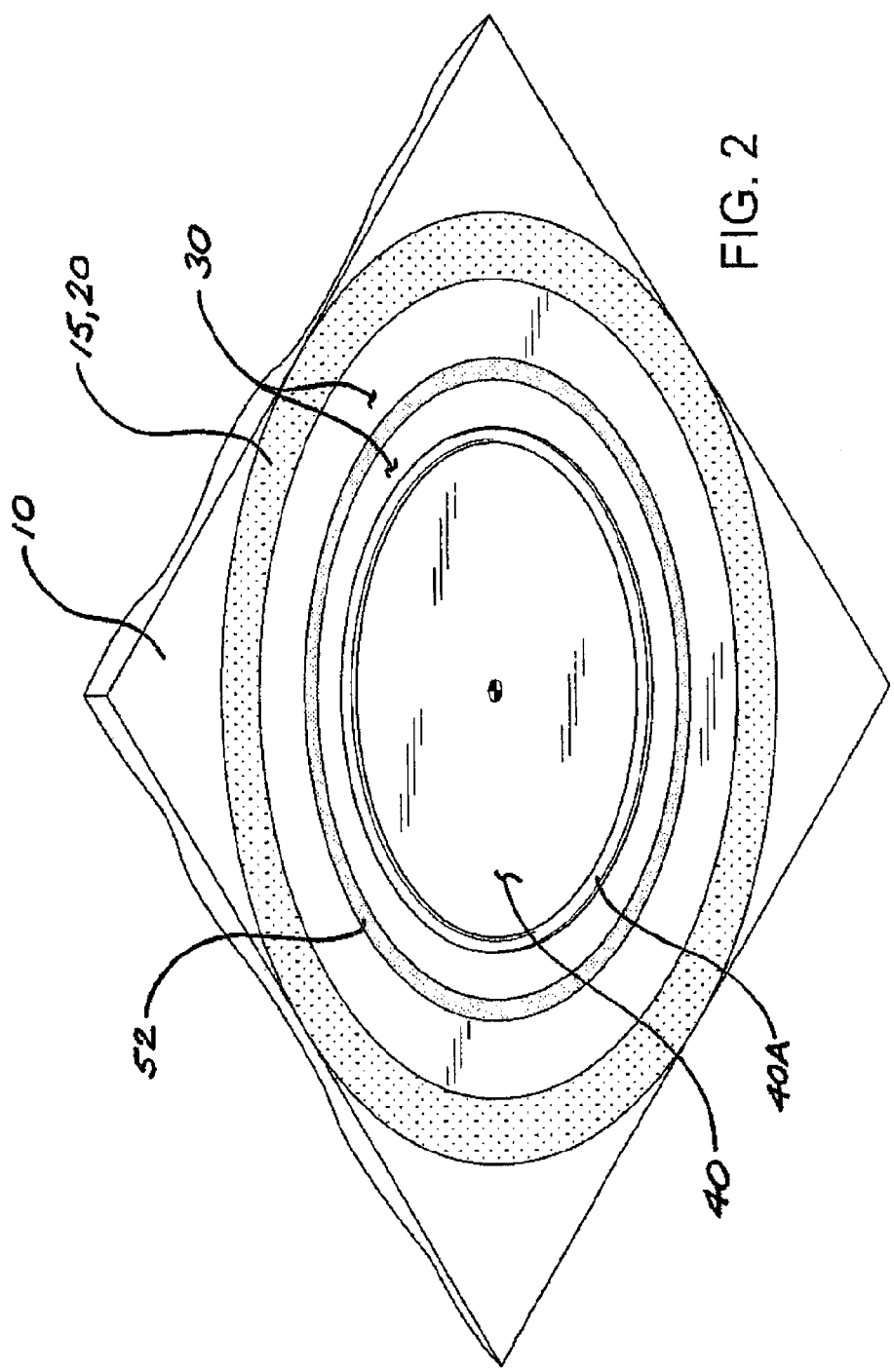
FIG. 2 is a perspective view of a storage tank site as in FIG. 1 during the initial stages of construction of a dual-tank liquid storage system in accordance with one embodiment of a method taught herein, showing an outer tank liner laid out over the base course, a circular liner protection strip laid over the outer tank liner, and a partially deployed inner tank liner laid out over the outer tank liner.

As illustrated in FIG. 2, the next step in the tank construction process is to provide a flexible, impermeable secondary tank liner 30, sized and configured to cover the circular base area of the secondary (i.e., outer) tank and to extend upward and over the inside face of perimeter wall of the secondary tank. Secondary tank liner 30 is laid out over base course 20 (and base course protection layer 15) so as to cover a generally circular area within the intended circular perimeter of the secondary tank.

A suitable liner protection strip 52 is preferably provided over secondary tank liner 30 along a circular path corresponding to the intended perimeter of the primary tank, to provide a surface upon which the walls of the primary tank can be constructed without causing localized damage to the underlying portion of secondary tank liner 30. Liner protection strip 52 may be provided in any form suitable for this purpose, such as (by way of non-limiting example) a double ring of geocomposite or geotextile material. In a preferred embodiment, liner protection strip 52 comprises a double layer of geotextile having a felt layer on the top and bottom.

Either before or after liner protection means 52 has been placed, a flexible, impermeable primary tank liner 40, sized and configured to cover the circular base area of the primary tank and to extend upward and over the inside face of the perimeter wall of the primary tank, is laid out over secondary tank liner 30 so as to cover a generally circular area within the intended circular perimeter of the primary tank, but the outer portion 40A of primary tank liner 40 that will ultimately be extended up and over the primary tank wall is rolled up like a tarpaulin such that the rolled-up wall portion 40A is temporarily positioned a convenient distance radially inward from the intended perimeter of the primary tank. For example, for a primary tank having a diameter of 135 feet (≈41 meters), primary tank liner 40 will preferably be rolled out such that the diameter of rolled-up wall portion 40A is approximately 90 feet (≈27 meters), in order to provide ample working clearance from the area where the primary tank is to be erected.

Figure 3:
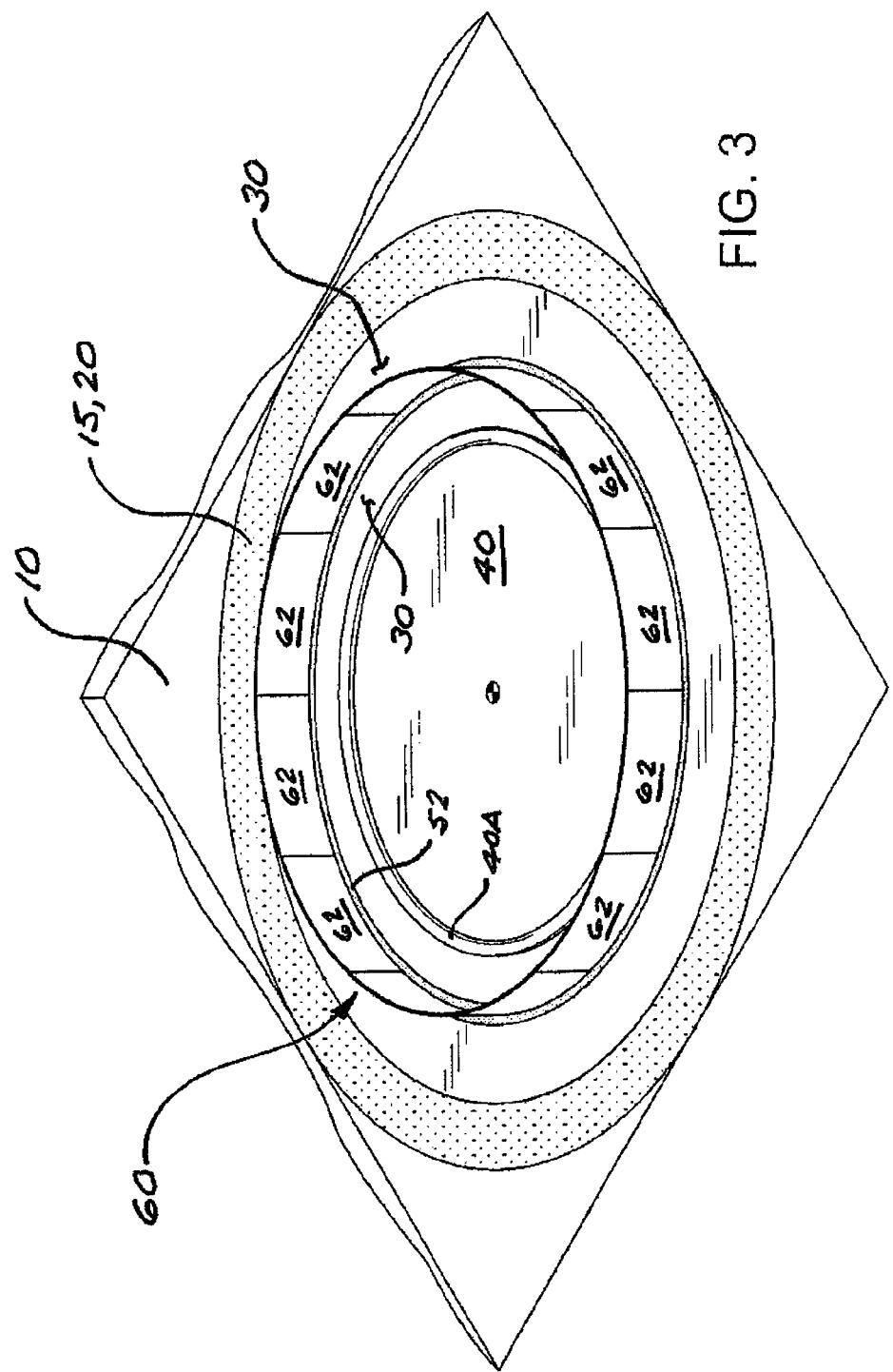
FIG. 3 is a perspective view of a storage tank assembly under construction as in FIG. 2, shown after erection of inner tank wall panels over a circular liner protection strip.

FIG. 3 illustrates a plurality of curved modular tank wall panels 62 that have been erected over liner protection strip 52 to form the walls of a primary tank 60. Persons skilled in the art will understand that the erection of primary tank wall panels 62 may and typically will entail the use of temporary bracing (not shown) to stabilize panels 62. Temporary bracing may be of any suitable type, and may be provided exterior and/or interior to wall panels 62. Suitable protective means should be provided to protect secondary tank liner 30 from damage that might otherwise be caused by the installation of temporary bracing. In an alternative (and unillustrated) embodiment of the present tank system construction process, an outer portion of secondary tank liner 30 may be partially rolled up, with the rolled-up portion is positioned fairly close to the perimeter of primary tank 60, such that exterior temporary bracing can bear directly onto base course protection layer 15 over base course 20 without impinging on secondary tank liner 30. After all wall panels 62 have been erected to form an inherently stable primary tank 60, all temporary bracing will be removed.

Figure 4:
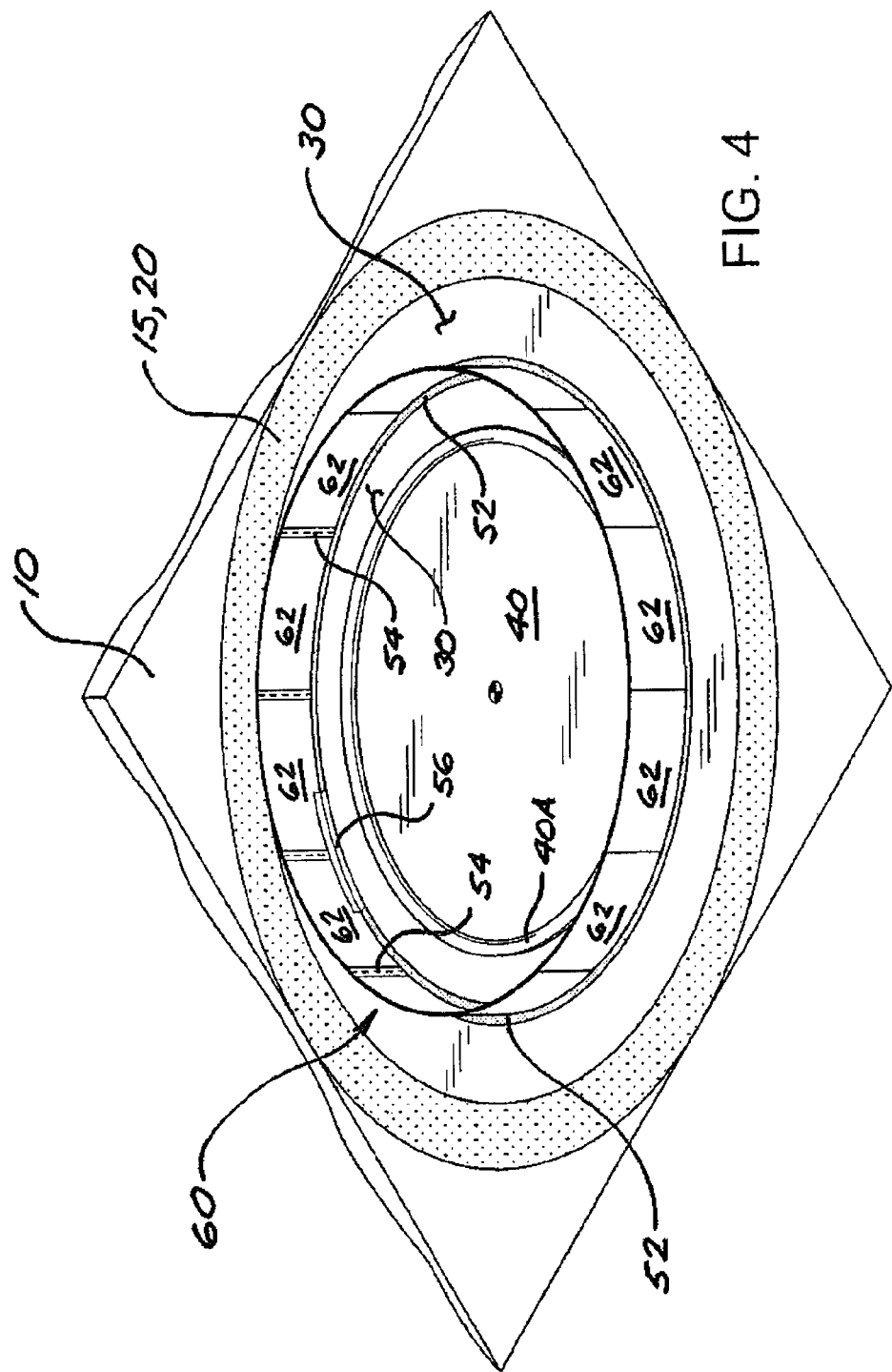
FIG. 4 is a perspective view of a storage tank assembly under construction as in FIG. 3, illustrating the application of liner protection means over vertical joints between adjacent inner tank wall panels and at the interior circumferential juncture between the erected wall panel assembly and the outer tank liner.

FIG. 4 illustrates the placement of liner protection strips 54 over vertical joints between adjacent primary tank wall panels 62 to protect against localized physical damage to wall portion 40A of primary tank liner portion 40 when it is extended up and over wall panels 62, such as liner damage that might occur as a result of movement across vertical joints between adjacent wall panels or panel misalignments due to fabrication and/or erection tolerances. For similar purposes, a continuous liner protection strip 56 is preferably placed along the interior perimeter of primary tank 60 where it rests upon secondary tank liner 30 over base course 20. It should be understood, however, that liner protection strips 54 and 56 are not essential, and the practical need for same will typically be determined on a case-by-case basis subject to an assessment of the likelihood and potential significance of joint movements and/or tolerance issues.

Figure 5:
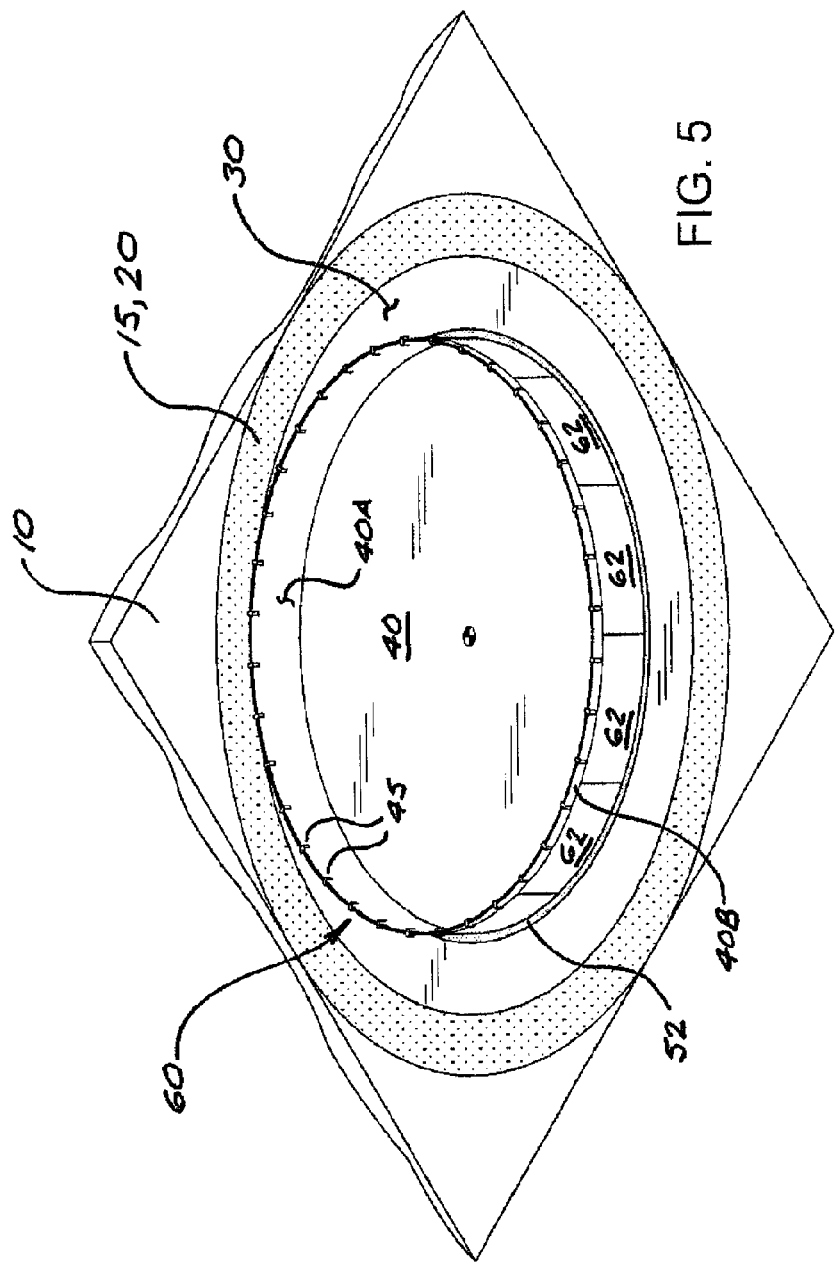
FIG. 5 is a perspective view of a storage tank assembly under construction as in FIG. 4, shown after the inner tank liner has been deployed over and secured to the inner tank wall assembly.

FIG. 5 illustrates a completed primary tank 60, with wall portion 40A of primary tank liner 40 deployed to cover the inner surfaces of primary tank wall panels 62 and with an outer edge portion 40B of primary tank liner 40 extending over the top of wall panels 62 and secured thereto by suitable removable clamp means 45.

Figure 6:
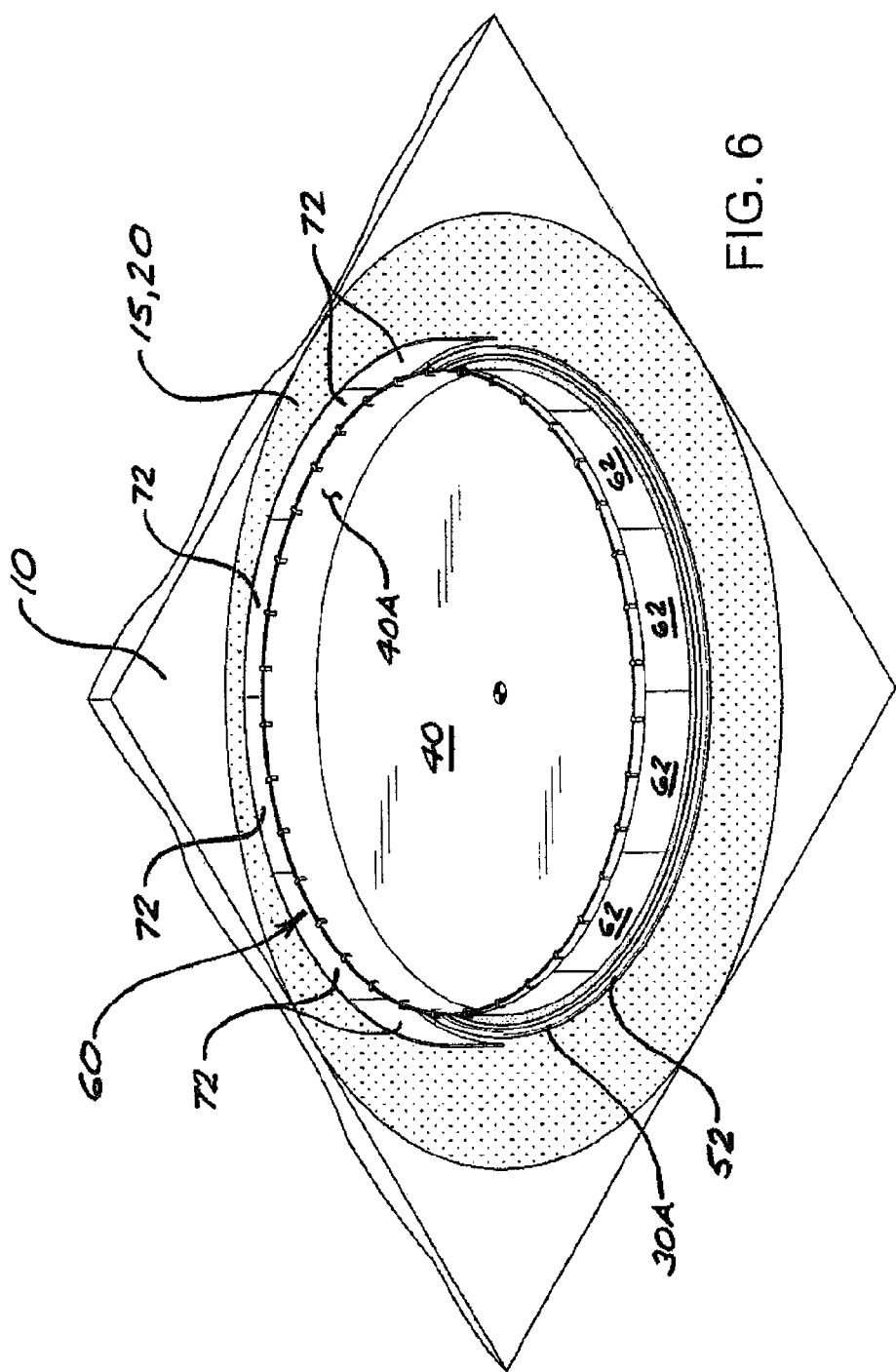
FIG. 6 is a perspective view of a storage tank assembly under construction as in FIG. 5, illustrating the outer tank wall panels being erected over the base course.

FIG. 6 illustrates a plurality of curved modular tank wall panels 72 being erected on top of base course protection layer 15 over base course 20 to form a secondary tank 70. As shown in FIG. 6, the outer portion 30A of secondary tank liner 30 that will ultimately cover the inner surfaces of the secondary tank wall assembly has been rolled up so that it is inside the perimeter of secondary tank 70, and preferably as close as possible to primary tank 60 to maximize the working room for erecting secondary tank 70.

Although not illustrated, temporary bracing will typically be used during the erection of secondary tank wall panels 72, generally as described above with respect to the erection of primary tank wall panels 62. In cases where the radial distance between primary tank 60 and secondary tank 70 is not large (as in the illustrated embodiment), typically only exterior bracing will be used during the erection of secondary tank wall panels 72. In alternative embodiments of the tank construction process, secondary tank wall panels 72 could also be temporarily braced against the completed primary tank structure 60.

After all secondary tank wall panels 72 have been erected so as to form an inherently stable secondary tank 70, all temporary bracing can be removed. Liner protection strips (not shown) may be placed over vertical joints between adjacent secondary tank wall panels 72 and along the interior perimeter of secondary tank 70 where it rests upon base course 20, generally as described previously with respect to primary tank 60.

Figure 7:
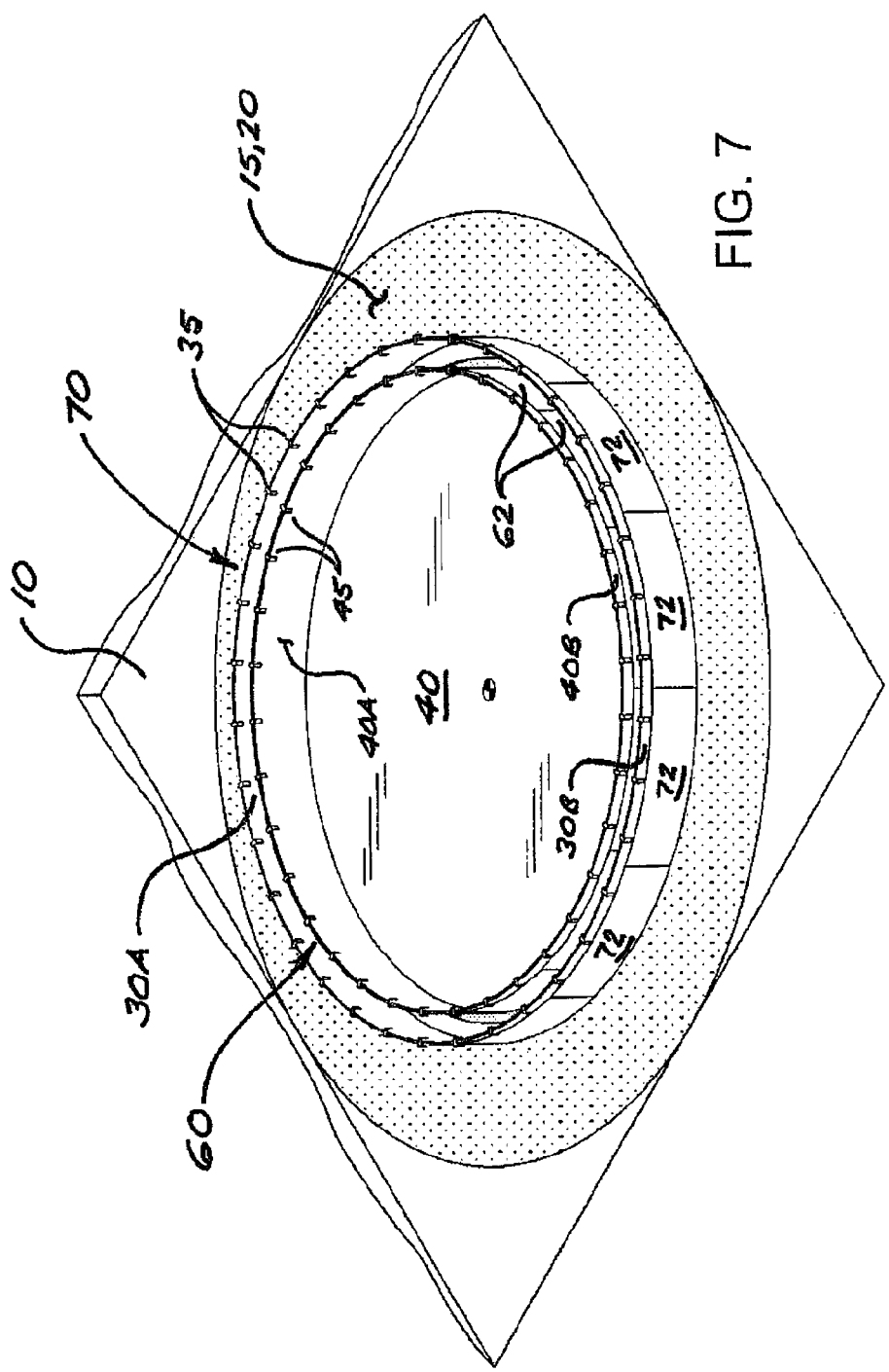
FIG. 7 is a perspective view of a storage tank assembly under construction as in FIG. 6, shown after the outer tank liner has been deployed over and secured to the outer tank wall assembly.

FIG. 7 illustrates a completed secondary tank 70, with wall portion 30A of secondary tank liner 30 deployed to cover the inner surfaces of secondary tank wall panels 72 and with an outer edge portion 30B of secondary tank liner 30 extending over the top of wall panels 72 and secured thereto by suitable removable clamp means 35. The tank assembly is now ready to receive ancillary equipment and appurtenances (e.g., tank inlet and outlet piping; tank level gauges; catwalks and access platforms).

Figure 8:
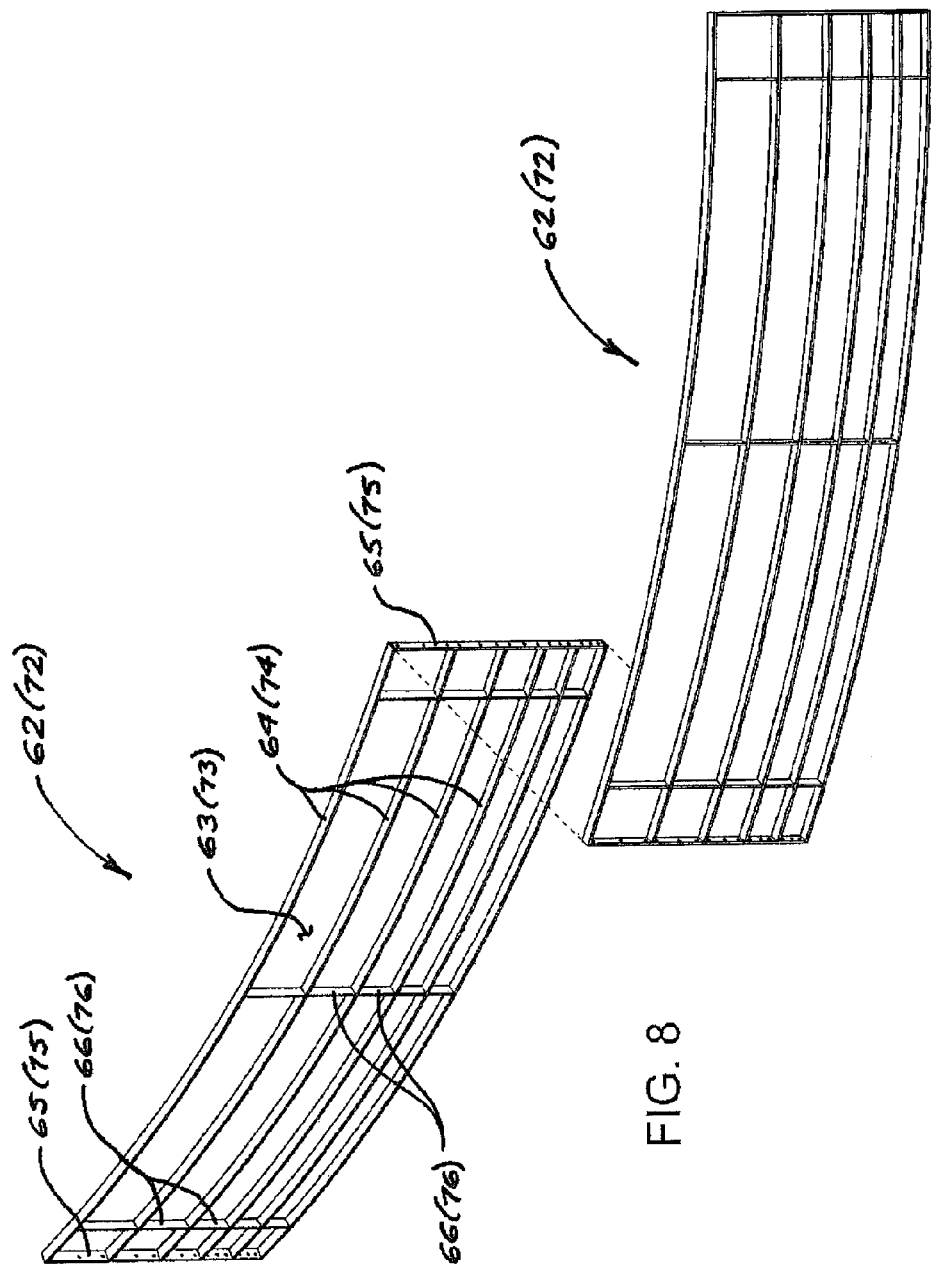
FIG. 8 is a perspective view of a representative pair of modular tank wall panels of the tank assembly illustrated in FIGS. 3-7.
Figure 9:
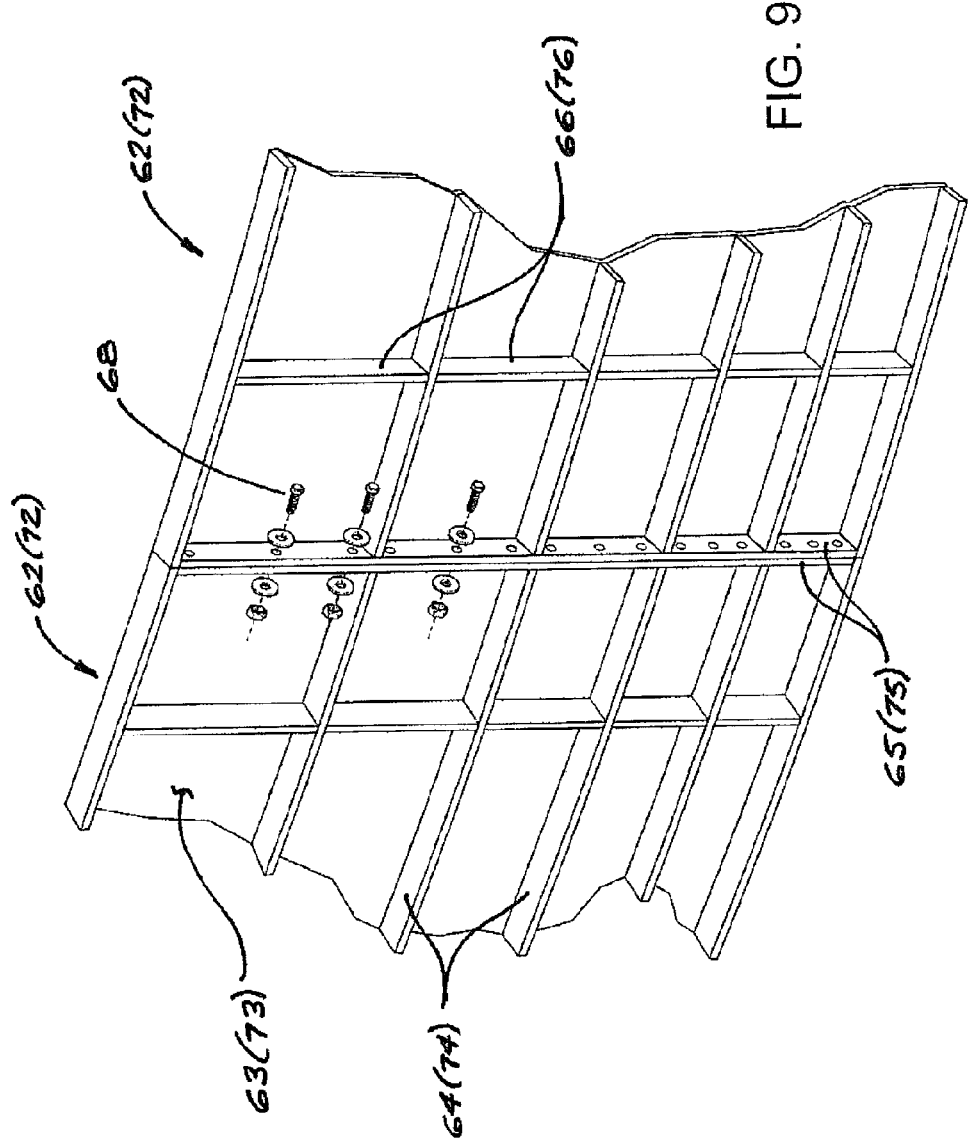
FIG. 9 is a perspective view of the vertical joint between an abutting pair of tank wall panels as in FIG. 8, illustrating an exemplary and non-limiting example of a structural connection between the vertical edges of the abutting wall panels.

FIGS. 8 and 9 illustrate non-limiting examples of curved modular tank wall panels 62 (or 72), each comprising a horizontally-curved tank wall plate 63 (73) reinforced by a plurality externally-mounted, horizontally-curved structural stiffeners 64 (74), and with secondary vertical stiffeners 66 (76) extending between vertically-adjacent horizontal stiffeners 64 (74). The spacing of horizontal stiffeners 64 (74) preferably becomes smaller toward the bottom of wall panel 62 (72), thus reducing the vertical span of wall plate 63 (73) in order to minimizing wall plate thickness requirements while keeping flexural stresses in wall plate 63 (73) within safe limits as hydrostatic pressures exerted against wall plate 63 (73) increase toward the bottom of wall panel 62 (72).

An edge stiffener 65 (75) is provided along each vertical side edge of wall panel 62 (72). In the illustrated embodiment, and as shown in detail in FIG. 9, edge stiffeners 65 (75) are provided with bolt holes for receiving bolts 68 which will be installed in the field to structurally connect adjacent wall panels 62 (72). However, the illustrated panel connection detail is by way of non-limiting example only, and persons skilled in the art will appreciate that wall panels 62 (72) can be structurally interconnected in various different ways, and that the selected structural connection details have no material bearing on the disclosed tank construction systems and concepts.

Figure 10:
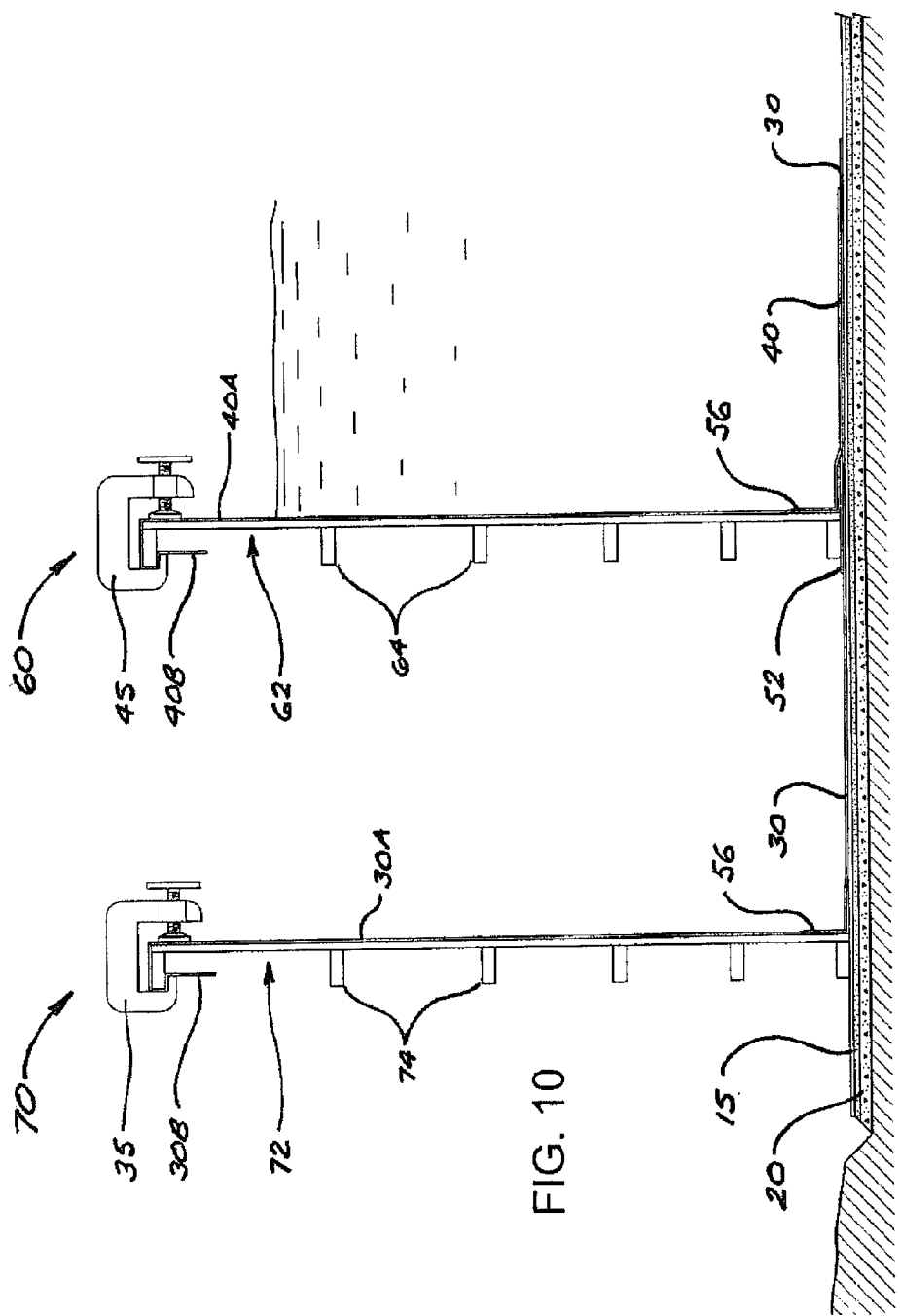
FIG. 10 is a vertical cross-section through a completed storage tank assembly as in FIG. 7, shown with the inner tank filled with liquid.

FIG. 10 illustrates the completed dual-tank system in operation, with primary tank 60 filled with liquid. In the event of a leak developing in primary tank liner 40, any escaping liquid will be retained by secondary tank liner 30 within secondary tank 70.

When the tank system is no longer needed on site, it is a simple matter to disassemble tanks 60 and 70 and to remove their respective liners 40 and 30 and all related components, by essentially reversing the various steps described above. The site can then be landscaped as desired to restore the site to a substantially natural and environmentally undisturbed condition.

It will be readily appreciated by those skilled in the art that various modifications to embodiments in accordance with the present disclosure may be devised without departing from the scope of the present teachings, including modifications using equivalent structures or materials hereafter conceived or developed. It is to be especially understood that the scope of the present disclosure is not intended to be limited to described or illustrated embodiments, and that the substitution of a variant of a described or claimed element or feature, without any substantial resultant change in functionality, will not constitute a departure from the scope of the disclosure.

In this patent document, any form of the word "comprise" is to be understood in its non-limiting sense to mean that any item following such word is included, but items not specifically mentioned are not excluded. A reference to an element by the indefinite article "a" does not exclude the possibility that more than one such element is present, unless the context clearly requires that there be one and only one such element.

As used herein, relative or relational terms such as but not limited to "vertical" are not intended to denote or require mathematical or geometric precision. Accordingly, such terms are to be understood in a general sense rather than a precise sense (e.g., "substantially vertical"), unless the context clearly requires otherwise.

Wherever used in this document, the terms "typical" and "typically" are to be understood in the sense of representative or common usage or practice, and are not to be understood as implying invariability or essentiality.

What is claimed is:

1. A method for constructing a liquid storage tank with secondary containment means, said method comprising the steps of:
    (a) preparing a base course over a selected ground area;
    (b) providing a flexible secondary liner sized to cover the base area and inside walls of a secondary tank of selected size and configuration, and laying out the secondary liner over the base course;
    (c) providing a flexible primary liner sized to cover the base area and inside walls of a primary tank sized to fit within the perimeter of the secondary tank;
    (d) laying out the primary liner over the secondary liner, with an outer portion of the primary liner being rolled up to fit within the perimeter of the primary tank;
    (e) erecting a plurality of primary tank wall panels over the secondary liner to construct a primary tank wall having vertical joints between adjacent primary tank wall panels;
    (f) deploying the primary liner over the primary tank wall;
    (g) rolling up an outer portion of the secondary liner to fit within the perimeter of the secondary tank;
    (h) erecting a plurality of secondary tank wall panels over the base course to construct a secondary tank wall; and
    (i) deploying the secondary liner over the secondary tank wall.

2. A method as in claim 1 comprising the further step of covering the base course with a geotextile protective layer prior to laying out the secondary liner over the base course.

3. A method as in claim 1 comprising the further step of positioning a liner protection material over the secondary tank liner at primary tank wall panel locations, prior to erecting the primary tank wall panels.

4. A method as in claim 1 comprising the further step of providing a liner protection material around the perimeter of the primary tank wall, overlapping a lower region of the inner surface of the primary tank wall and an adjacent region of the secondary liner, prior to deploying the primary liner over the primary tank wall.

5. A method as in claim 1 comprising the further step of providing a liner protection material over the vertical joints between adjacent primary tank wall panels, prior to deploying the primary liner over the primary tank wall.

6. A method as in claim 1 comprising the further step of providing a liner protection material around the perimeter of the secondary tank wall, overlapping a lower region of the inner surface of the secondary tank wall and an adjacent region of the base course, prior to deploying the secondary liner over the secondary tank wall.

7. A method as in claim 1 comprising the further step of providing a liner protection material over the vertical joints between adjacent secondary tank wall panels, prior to deploying the secondary liner over the secondary tank wall.

8. A method as in claim 1 wherein the primary and secondary tanks are of generally circular configuration.

9. A method as in claim 8 wherein the primary and secondary tanks are of arcuate configuration.

10. A method as in claim 1 wherein the primary and secondary tanks are open-topped tanks.

11. A liquid storage system comprising:
    (a) a secondary containment tank having:
        a secondary tank wall comprising a plurality of demountable secondary tank wall panels having vertical joints between adjacent secondary tank wall panels, said secondary tank wall being constructed over a geotextile protective layer overlying an engineered base course, wherein said secondary tank wall defines secondary tank inner perimeter wall surfaces and a secondary tank base area; and
        a secondary tank liner deployed over said secondary tank inner perimeter wall surfaces and said secondary tank base area; and
    (b) a primary storage tank having:
        a primary tank wall comprising a plurality of demountable primary tank wall panels having vertical joints between adjacent primary tank wall panels; and
        a primary liner deployed over the primary storage tank's base area and inner perimeter wall surfaces, said primary storage tank being constructed within the perimeter of the secondary containment tank over the secondary liner covering the secondary tank base area.

12. A liquid storage system as in claim 11, wherein the geotextile protective layer comprises a double layer of geotextile.

13. A liquid storage system as in claim 11, further comprising a liner protection material over the secondary tank liner at primary tank wall panel locations.

14. A liquid storage system as in claim 11, further comprising a liner protection material disposed between the primary tank wall and the primary liner around the perimeter of the primary tank wall, overlapping a lower region of the inner surface of the primary tank wall and an adjacent region of the secondary liner.

15. A liquid storage system as in claim 11, further comprising a liner protection material disposed between the primary tank wall and the primary liner over the vertical joints between adjacent primary tank wall panels.

16. A liquid storage system as in claim 11, further comprising a liner protection material disposed between the secondary tank wall and the secondary liner around the perimeter of the secondary tank wall, overlapping a lower region of the inner surface of the secondary tank wall and an adjacent region of the base course.

17. A liquid storage system as in claim 11, further comprising a liner protection material disposed between the secondary tank wall and the secondary liner over the vertical joints between adjacent secondary tank wall panels.

18. A liquid storage system as in claim 11 wherein the primary and secondary tanks are of generally circular configuration.

19. A liquid storage system as in claim 11 wherein the primary and secondary tanks are of arcuate configuration.

20. A liquid storage system as in claim 11 wherein the primary and secondary tanks are open-topped tanks.

21. A method as in claim 1 wherein the primary and secondary tanks are concentric.

22. A liquid storage system as in claim 11 wherein the primary and secondary tanks are concentric.

* * * * *